(12) United States Patent  (10) Patent No.: US 6,586,672 B2
Kobus et al.  (45) Date of Patent: Jul. 1, 2003

(54) ELECTRICAL INSULATING BOX ASSEMBLY FOR ELECTRICAL FIXTURES

(75) Inventors: John R. Kobus, Tinton Falls, NJ (US); Victor P. Flagello, New Fairfield, CT (US); Sorin I. Mortun, Irvington, NY (US); Christopher R. Kuhn, Madison, CT (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/905,925

(22) Filed: Jul. 17, 2001

(65) Prior Publication Data

US 2003/0015333 A1 Jan. 23, 2003

(51) Int. Cl.[7] .................................................. H02G 3/08
(52) U.S. Cl. ............................ 174/50; 174/48; 174/58; 220/3.2
(58) Field of Search ............................. 174/50, 53, 54, 174/58, 59, 60, 61, 63, 65 R, 17 R, 48; 220/3.2, 3.3, 3.94, 3.5, 3.6, 3.7, 3.8, 4.02

(56) References Cited

U.S. PATENT DOCUMENTS

| | | | | |
|---|---|---|---|---|
| 3,590,137 A | * | 6/1971 | Librandi ...................... 174/58 |
| 3,710,972 A | * | 1/1973 | Barry ........................... 174/58 |
| 3,848,764 A | * | 11/1974 | Salg ............................ 174/57 |
| 4,063,660 A | * | 12/1977 | Ware ........................... 174/58 |
| 4,076,364 A | * | 2/1978 | Kuo .......................... 174/65 R |
| 4,082,395 A | | 4/1978 | Donato et al. ................ 339/21 |
| 4,363,014 A | * | 12/1982 | Leach et al. ............. 174/138 F |
| 4,414,617 A | | 11/1983 | Galindo ....................... 362/404 |
| 4,529,258 A | | 7/1985 | Anthony ....................... 339/99 |
| 4,673,837 A | | 6/1987 | Gingerich et al. .......... 310/239 |
| 5,139,433 A | | 8/1992 | Bohaty ........................ 439/395 |
| 5,709,566 A | * | 1/1998 | Tsuji et al. .................. 439/397 |
| 5,820,404 A | * | 10/1998 | Chishima et al. ........... 439/404 |
| 5,964,615 A | | 10/1999 | Endres ........................ 439/419 |
| 6,333,464 B1 | * | 12/2001 | Ellison .................... 174/138 F |
| 6,361,333 B1 | * | 3/2002 | Cash, Jr. ..................... 439/106 |
| 6,375,338 B1 | * | 4/2002 | Cummings et al. ......... 362/226 |
| 6,422,889 B2 | * | 7/2002 | Hayashi ..................... 174/72 A |

\* cited by examiner

*Primary Examiner*—Dean A. Reichard
*Assistant Examiner*—Angel R. Estrada
(74) *Attorney, Agent, or Firm*—Marcus R. Mickney; Alfred N. Goodman

(57) ABSTRACT

An electrical insulating box assembly mounts an electrical fixture to a structure and electrically connects the electrical fixture to branch circuit wiring. The electrical box insulating assembly has a base having an upper surface, a lower surface, an outer edge, and a first plurality of openings extending through the base. A first wall extends downwardly from the base outer edge and is adapted to fit within an aperture in a surface. A flange extends radially outwardly from the first wall. A second wall extends upwardly from the upper surface of the base. A plurality of first terminals extend through the base and are positioned within the second wall. Each of the first terminals has a first end for receiving electrical conductors from branch circuit wiring and a second end for receiving electrical conductors from the electrical fixture. A cover attached to the second wall forms an enclosure to house the plurality of first terminals. Clips coupled to the insulating box assembly opposite to the flange mount the insulating box assembly by gripping the surface between the clips and the flange.

82 Claims, 6 Drawing Sheets

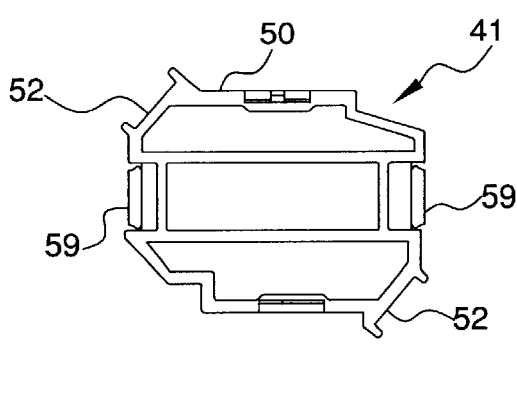
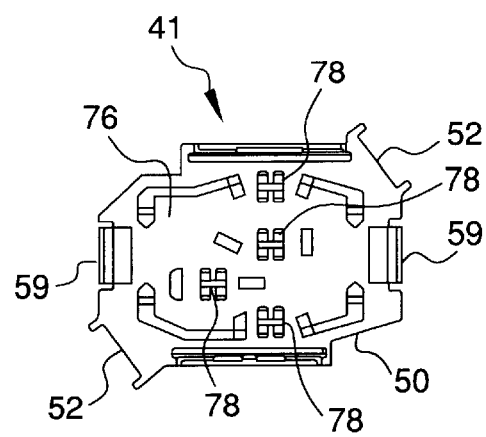
FIG. 10  FIG. 11
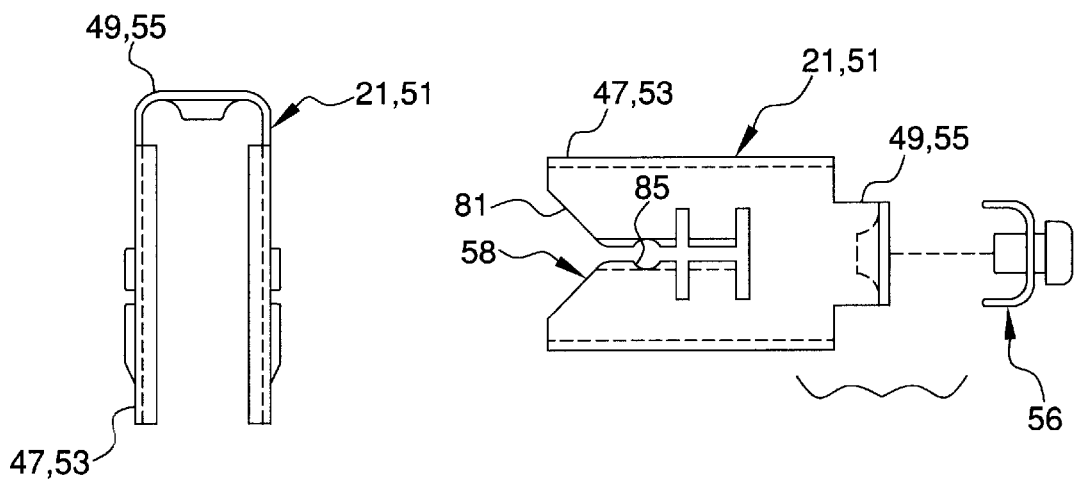
FIG. 12  FIG. 13
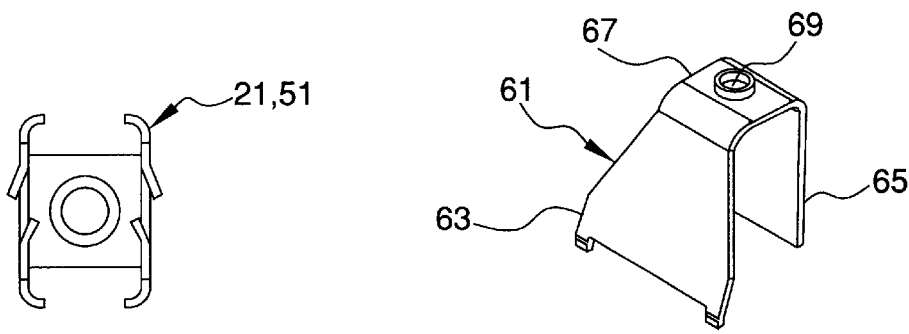
FIG. 14  FIG. 15

ELECTRICAL INSULATING BOX ASSEMBLY FOR ELECTRICAL FIXTURES

FIELD OF THE INVENTION

The invention relates to an electrical insulating box assembly for electrical fixtures. More particularly, the invention relates to an insulating box assembly for mounting an electrical fixture to a structure and electrically connecting the fixture to branch circuit cables insulation displacement connection terminals for electrically receiving circuit branch cables and/or electrical fixture cables.

BACKGROUND OF THE INVENTION

Wiring the various branch circuits of a typical electrical power distribution system is a time consuming and labor intensive job. Individual attention is required to place and attach every cable, junction box, plug receptacle, fixture, switch and the like, as well as every termination of every conductor associated therewith.

Electrical connections between the cable conductors and the terminals of each electrical insulating box are then completed one conductor at a time. Several steps are required to complete each conductor connection with a terminal of the electrical insulating box. First, the outer sheath of the electrical cable is slit and removed, for example with a cable stripper that has a small cutter designed to slice though the outer sheathing without damaging the insulated conductors within. The outer sheathing, such as an outer plastic and inner paper wrap, are cut away, usually leaving at least three individually insulated conductors. Two or three of the conductors have color coded insulation, white insulation denoting the neutral conductor, black insulation denoting the hot conductor, and red, if provided, denoting a switched conductor. The third or fourth conductor is usually an uninsulated ground conductor. Next, the inner insulation must then be stripped from the ends of the insulated conductors, preferably using a wire stripper that is adjusted to cut though the insulation without nicking the conductor. Once the branch circuit wires have been connected to the electrical insulating box terminals, the box may be secured to a planar surface, generally a ceiling, and an electrical fixture may be attached to the box.

If the electrical box does not include terminals, the circuit conductor ends are stripped, fed into the box interior and clamped to the box by a strain relief. The conductor ends are then coupled directly to the fixture cables by wire nuts.

Examples of existing stripless wiring terminals are disclosed in the following references: U.S. Pat. Nos. 3,951,336; 3,951,489; 3,951,502; and 3,957,336 to Bromberg; U.S. Pat. No. 4,529,258 to Anthony; and U.S. Pat. No. 5,964,615 to Endres.

A need exists for electrical insulating box assemblies and a method of connecting the box assemblies to branch circuit cables and electrical fixture cables that has a reduced and simplified number of steps. A need also exists for electrical insulating box assemblies allowing electrical cables to be connected to the box assembly terminals without requiring the insulation to be stripped from the individual conductors in the electrical cable. A need also exists for electrical insulating box assemblies having integral terminals for both the branch circuit cables and the electrical fixture cables, thereby eliminating the need for separate strain relief devices, electrical boxes and wire nuts. Such electrical boxes are generally referred to as ceiling boxes or outlet boxes and provide a mounting means to the support structure for the electrical fixture.

Thus, there is a continuing need to provide improved electrical insulating box assemblies for quickly and easily connecting electrical cables to assembly terminals and mounting the assemblies to structures.

SUMMARY OF THE INVENTION

Accordingly, it is a primary objective of the present invention to provide an electrical insulating box assembly and a method of connecting the box assembly to branch circuit cables and electrical fixture cables that has a reduced and simplified number of steps, thereby providing quick and efficient installation of the electrical insulating box assembly and the electrical fixture.

Another object of the invention is to provide an electrical insulating box assembly allowing electrical cables to be connected to the box assembly terminals without requiring the insulation to be stripped from the individual conductors in the electrical cable.

A further objective of the present invention is to provide an electrical insulating box assembly having integral terminals for both the branch circuit cables and the electrical fixture cables, thereby eliminating the need for separate electrical boxes and wire nuts.

The foregoing objects are basically attained by providing an electrical insulating box assembly for mounting an electrical fixture. The electrical box insulating assembly has a base having an upper surface, a lower surface, an outer edge, and a first plurality of openings extending through the base. A first wall extends downwardly from the base outer edge and is adapted to fit within an aperture in a surface. A flange extends radially outwardly from the first wall. A second wall extends upwardly from the upper surface of the base. A plurality of first terminals extend through the base and are positioned within the second wall. Each of the first terminals has a first end for receiving electrical conductors from branch circuit wiring and a second end for receiving electrical conductors from the electrical fixture. A cover attached to the second wall forms an enclosure to house the plurality of first terminals. Clips coupled to the insulating box assembly opposite to the flange mount the insulating box assembly by gripping the surface between the clips and the flange.

Other objects, advantages and salient features of the invention will become apparent from the following detailed description, which, taken in conjunction with the annexed drawings, discloses a preferred embodiment of the invention.

As used in this application, the terms "upper", "lower", "side", "top", "bottom", and the like are intended to facilitate the description of the insulating box assembly. Thus, such terms are merely illustrative of the assembly and are not intended to limit the assembly to any specific orientation.

BRIEF DESCRIPTION OF THE DRAWINGS

Referring now to the drawings that form a part of the original disclosure:

FIG. 10 is a top plan view of the cover of the insulating box assembly of FIG. 1;

FIG. 11 is a bottom plan view of the cover of the insulating box assembly of FIG. 1;

FIG. 12 is a side elevational view of the connection terminal assembly of the insulating box assembly of FIG. 1;

FIG. 13 is a front elevational view of the connection terminal assembly showing the terminal screw of the insulating box assembly of FIG. 1;

FIG. 14 is a top plan view of the terminal assembly of the insulating box assembly of FIG. 1;

FIG. 15 is a perspective view of the mounting clip of the insulating box assembly of FIG. 1;

DETAILED DESCRIPTION OF THE INVENTION

Figure 1:
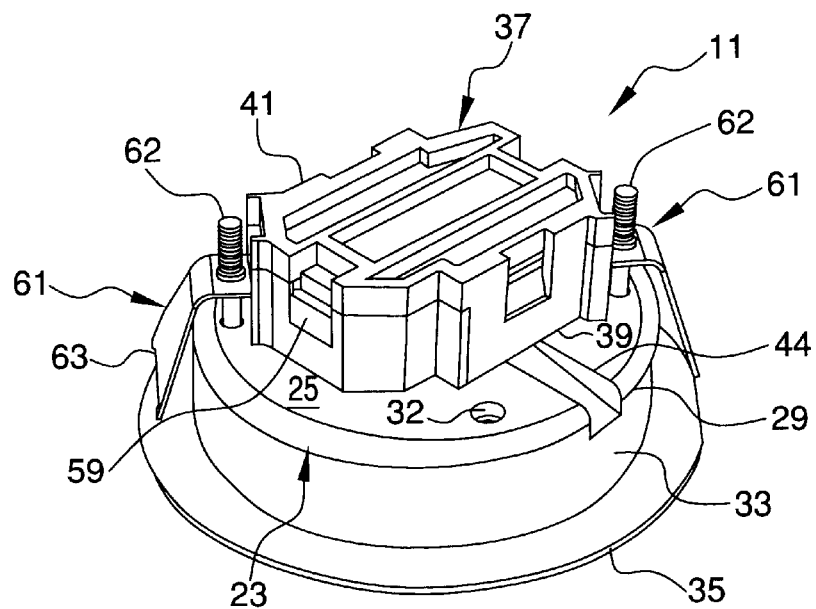
FIG. 1 is a perspective view of the insulating box assembly according to the present invention, showing an upper end of the assembly.

As shown in FIGS. 1–20, the present invention relates to an electrical insulating box assembly 11 for mounting an electrical fixture 13 to a support surface 15 and electrically connecting the electrical fixture to branch circuit wiring 17. The insulating box assembly 11 has connection terminal assemblies 21 and 51, shown in FIGS. 12–14, for electrically receiving circuit branch wiring 17 and electrical fixture cables 19.

Figure 2:
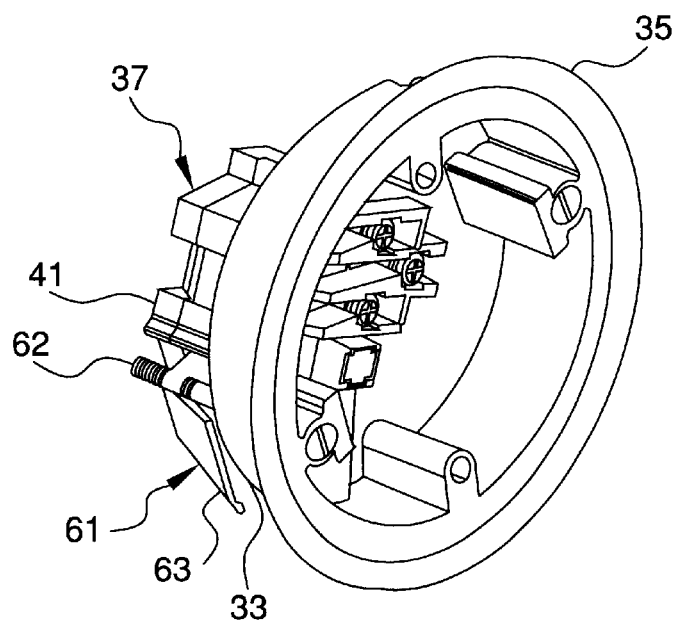
FIG. 2 is a perspective view of the insulating box assembly of FIG. 1, showing the electrical fixture end of the connection terminal assemblies.
Figure 3:
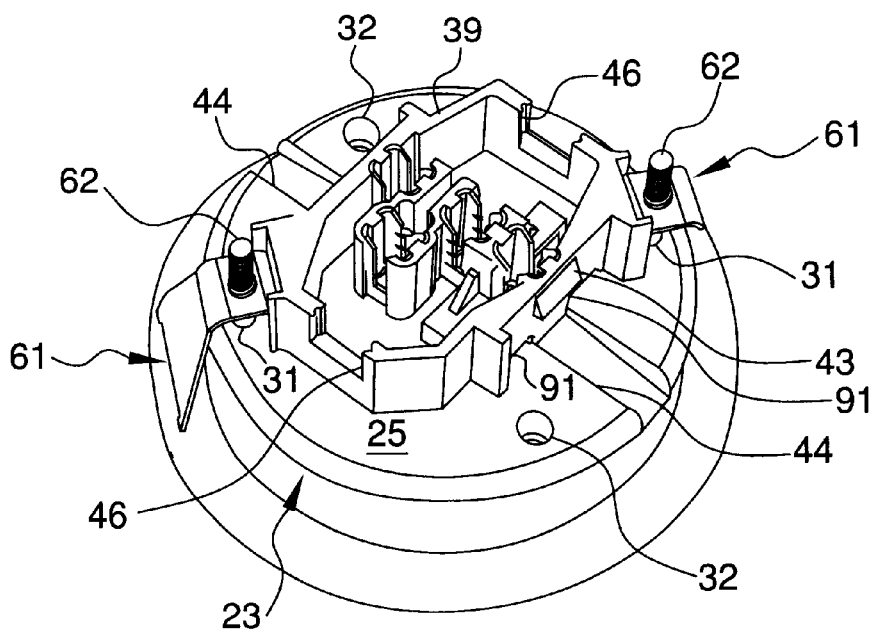
FIG. 3 is a perspective view of the main body of the insulating box assembly of FIG. 1 without a cover, showing the branch circuit wiring end of the connection terminal assemblies.
Figure 4:
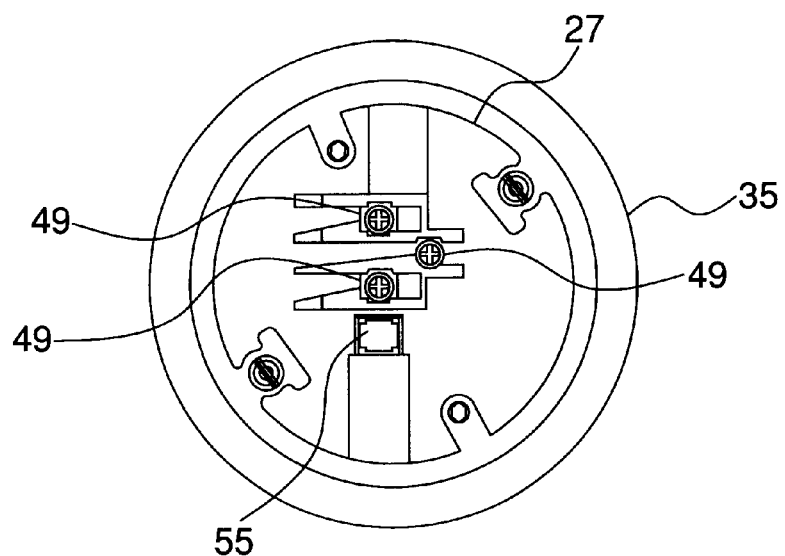
FIG. 4 is a bottom plan view of the insulating box assembly of FIG. 1, showing the electrical fixture end of the connection terminal assemblies.
Figure 5:
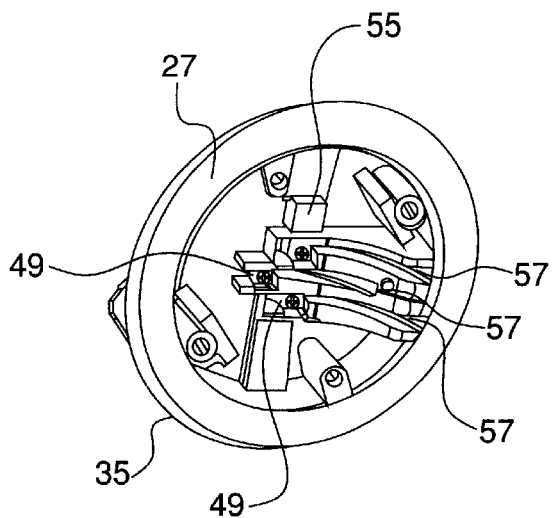
FIG. 5 is a bottom perspective view of the main body of the insulating box assembly according to a second embodiment of the present invention, showing channels that guide conductors to the electrical fixture end of the connection terminal assemblies.
Figure 19:
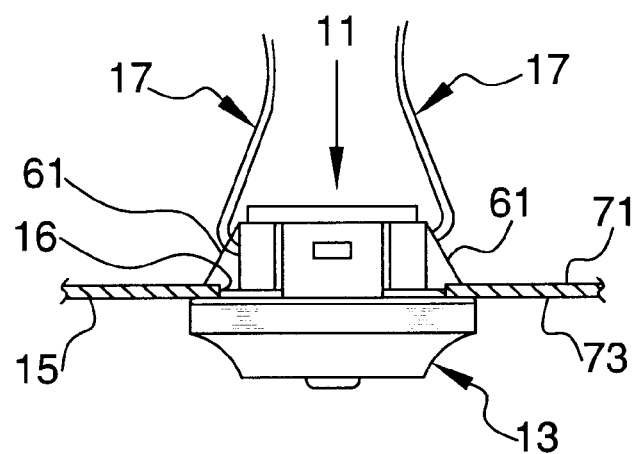
FIG. 19 is a side elevational view of a lighting fixture connected to the insulating box assembly of FIG. 1 and mounted to a ceiling.

As shown in FIGS. 1–4, the electrical insulating box assembly 11 of the first embodiment has a base 23 that has an upper surface 25, a lower surface 27, an outer edge 29, and a first plurality of openings 31 that extend through the base A first wall 33 extends downwardly from the base outer edge 29. Preferably, the first wall 33 extends substantially perpendicularly from the base outer edge 29 and forms a circular, cylindrical wall adapted to fit within a circular aperture 16 in the support surface 15 to which the electrical insulating box assembly 11 is to be mounted, as shown in FIG. 19. Typically, the support surface 15 to which the electrical insulating box assembly 11 and electrical fixture 13 are mounted is a ceiling. A flange 35 extends radially outwardly from the first wall 33 to engage the ceiling adjacent the aperture, thereby preventing the electrical insulating box assembly 11 from being inserted completely through the aperture 16 in the ceiling 15, An enclosure 37 is formed by a second wall 39 extending upwardly from the upper surface 25 of the base 23 and a cover 41 secured to the second wall, as shown in FIGS. 1, 3 and 6–8. Preferably, the second wall 39 extends substantially perpendicularly from the upper surface 25 of the base 23. Tapered projections 43 on the second wall receive corresponding openings 45 in resilient latches or tabs 42 on the cover 41, shown in FIGS. 9–11, to secure the cover to the second wall, as shown in FIG. 1. Tabs 42 extend downwardly from the cover base 50. Preferably, the cover tabs 42 extend substantially perpendicularly from the cover base 50. A channel 44 extends from the second wall 39 proximal the projections across the upper surface 25 of the base 23 to the first wall 33 for receiving a tool to remove the cover 41 from the second wall. A tool, such as the flat end of a screwdriver, is inserted into the channel 44 to disengage the latches and to lift the cover 41 away from the projections 43, thereby releasing the engagement between the projections and cover openings 45 to remove the cover from the second wall 39. Openings 46 extend through the enclosure second wall 39 for electrical cables coupled to first ends of first and second terminals within the enclosure, as shown in FIG. 3. Preferably, the openings are spaced approximately 180 degrees apart.

Removable tabs 59 are received by the branch circuit wiring openings 46 in the second wall 39, thereby preventing contamination and blocking branch circuit wiring 17 from being received through the openings in the second wall. The removable tabs 59 are removed as needed to receive branch circuit wiring 17.

Figure 6:
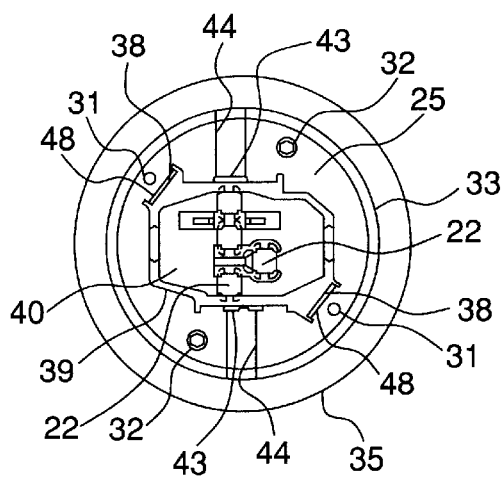
FIG. 6 is a top plan view of the insulating box assembly of FIG. 1 without a cover.
Figure 7:
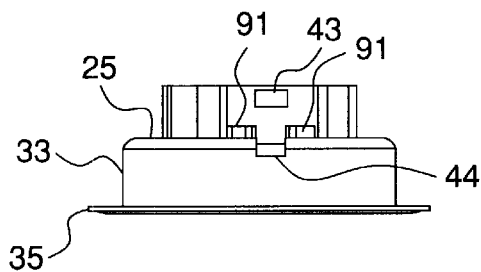
FIG. 7 is a front elevational view of the insulating box assembly of FIG. 1 without a cover, showing a projection for receiving the cover and a channel for receiving a tool for removing an attached cover.
Figure 8:
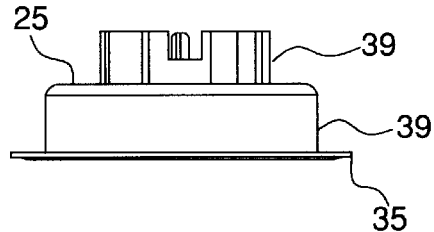
FIG. 8 is a side elevational view of the insulating box assembly of FIG. 1 without a cover, showing an opening for receiving a circuit branch conductors.
Figure 9:
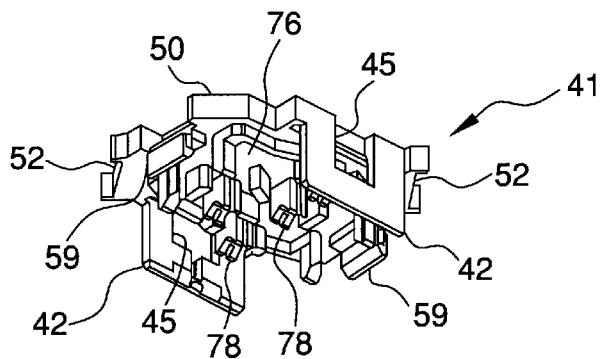
FIG. 9 is a bottom perspective view of the cover of the insulating box assembly of FIG. 1.

Clips 61 are coupled to the electrical insulating box assembly 11 opposite to the flange 35 for mounting the box assembly by gripping ceiling 15 between the clips 61 and the flange, as shown in FIG. 19. Preferably, the clips 61, as shown in FIG. 15, have a first leg 63 and a second leg 65 connected by a middle portion 67. The middle portion 67 has a threaded opening 69 for receiving and threadably engaging a fastener 62 for securing the clip 61 to the electrical insulating box assembly 11, as shown in FIG. 3. The first leg 63 rests on the upper surface 71 of the ceiling 15. The second leg 65 is received by recesses 3 8 and 52 in the second wall 39 and in the cover 41, respectively, as shown in FIGS. 6 and 9–10. The second leg 65 of the clip 61 rests on a shelf 48 in the second wall recess 38. The clips 61 support the electrical insulating box assembly 11 and the attached electrical fixture 13 and prevent the electrical insulating box assembly from falling through the aperture in the ceiling.

Figure 16:
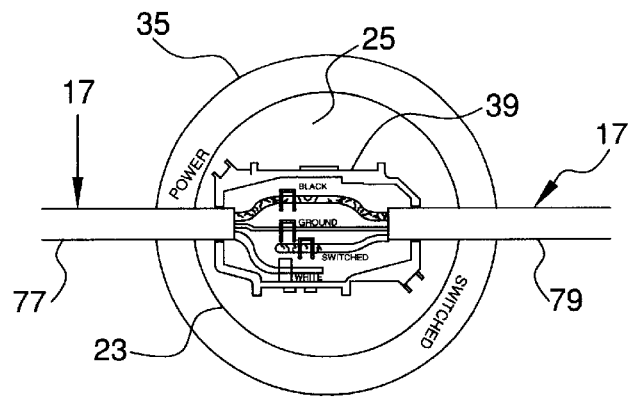
FIG. 16 is the diagrammatic plan view of wiring for the insulating box assembly of FIG. 1 with a switch.
Figure 17:
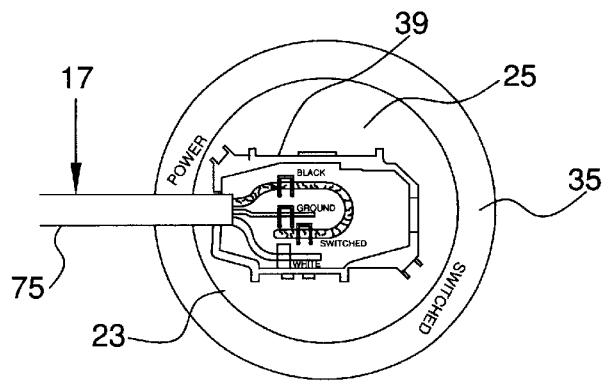
FIG. 17 is a diagrammatic plan view of wiring for the insulating box assembly of FIG. 1 without a switch.
Figure 18:
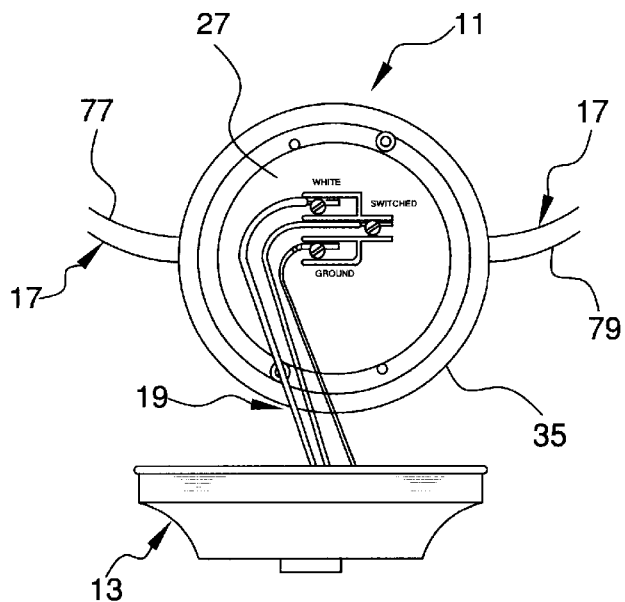
FIG. 18 is a diagram showing a lighting fixture cable connected to the connection terminal assemblies of the insulating box assembly of FIG. 1.

A plurality of first connection terminal assemblies 21 (FIGS. 12–14) extend through terminal openings 22 in the base 23 within the area 40 defined by the second wall 39. Each of the plurality of first connection terminal assemblies 21 has a first end 47 for receiving electrical conductors from branch circuit wiring 17 and a second end 49 for receiving electrical conductors from electrical cables 19 from the electrical fixture 13, as shown in FIGS. 16–18.

Additionally, a second connection terminal assembly 51 may be used that has a first connection end 53 for receiving an electrical conductor from branch circuit wiring 17 but that has no connection terminal at the second end 55. Preferably, the electric insulating box assembly 11 has three first connection terminal assemblies 21 and one second connection terminal assembly 51. Second connection terminal 51 is used since four connection terminals are required to connect to the powered branch circuit wiring 77 and the switched leg cable 79, as shown in FIG. 16, but only three connection terminals are required to connect a switched cable 75 to the electrical fixture cables, as shown in FIG. 18. In this second method, the terminal 55 is present but has no connection purpose The first ends of the first and second connection terminal assemblies are located above the upper surface 25 of the base 23, as shown in FIG. 3.

The first and second connection ends 47, 49 and 53 of the first and second connection terminal assemblies 21 and 51, respectively, may be any suitable connection terminal type, such as screw terminals 56 (FIG. 13), insulation displacement connection terminals 58 (FIG. 13), pressure contact terminals and plug and socket terminals. In one embodiment, the first ends 47 and 53 are preferably insulation displacement connection terminals and the second ends 49 of the first connection terminal assemblies 21 are screw terminals. In another embodiment, the first ends 47 and 53 of the connection terminal assemblies 21 and 51, respectively, are preferably insulation displacement connection terminals and the second ends 49 of the first connection terminal assemblies 21 are also insulation displacement connection terminals.

Figure 20:
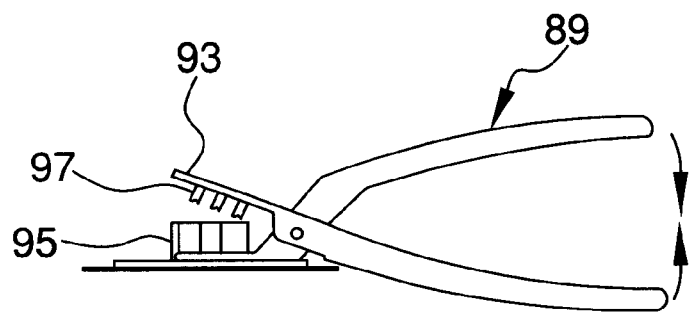
FIG. 20 is a side elevational view of the installing hand tool for connecting conductors to the terminals of the insulating box assembly of FIG. 1.

Insulation displacement connection terminals at the first ends of the connection terminal assemblies are shown in FIGS. 3, and 12–14. A V-shaped notch 81 at the first end 47 or 53 of the connection terminal assembly 21 or 51 facilitates insertion of a conductor into the terminal contacts 87. A conductor is initially positioned in a receiving pocket 85 in the connection terminal assembly. A conductor installation tool 89, as shown in FIG. 20, may then be used to simultaneously insert a plurality of conductors into their respective terminal contacts 87. The installation tool 89 is inserted through the opening 91 in the second wall 39 adjacent to the connection terminal assemblies 21 and 51. The tool receives a plurality of conductors and presses the conductors into their respective terminal contacts 87.

The installation tool 89, as shown in FIG. 20, has an upper jaw 93 and a lower jaw 95. The lower jaw 95 is fork-shaped (the tines are not shown) and is inserted into openings 91 in the second wall 39. When the tool 89 is fully inserted, the tines of the lower 95 jaw are adjacent to and underneath the insulating material of all of the terminal assemblies. During compression of the tool 89, the lower jaw supports the terminals and withstands the forces during insertion of the conductors into the contacts 87. The upper jaw 93 of the tool 89 has projections 97 that are aligned with the terminals. Preferably, the projections are V-shaped. The projections 97 hold the conductors and provide the pressure to insert the conductors into the contacts of the connection terminal assemblies when the tool 89 is squeezed. Projections 78 extending downwardly from a lower surface 76 of the cover 41 maintain the conductors in the contacts of the connection terminal assemblies once the cover has been snapped onto the second wall 39 to form the enclosure 37. Preferably, the cover projections 78 are V-shaped to facilitate maintaining the conductors in the contacts. As an alternative to the installation tool, the cover 41 may be used to insert the conductors into the contacts 87 with the cover projections 97, As shown in the second embodiment at FIG. 5, channels 57 are attached to the lower surface 27 of the base 23 adjacent the second ends 49 of the first connection terminal assemblies 21. Preferably, the channels 57 are curved having funnel-shaped entries to facilitate guiding the fixture conductors or cables to the second ends 49 of the connection terminal assemblies 21. Other configurations may be used to direct the conductors to the terminal assembly connection ends with a minimum of effort by the installer. The channels 57 contain the conductors, thereby reducing the tendency of the conductors to splay and short.

Branch circuit wiring 17 typically has one of two configurations. The first configuration has a single electrical cable 75 supplying power from a switch to the electrical fixture, as shown in FIG. 17, without a switched leg cable. The second configuration has two electrical cables, a first cable 77 supplying power directly to the fixture and the second cable 79 (the switched leg) connected between the fixture and a switch, as shown in FIG. 16. As shown in FIG. 18, an electrical cable 19 running from the second end of the first connection terminals 21 to the electrical fixture 13 supplies electrical power to the fixture. Thus, the electrical insulating box assembly 11 may accommodate up to three electrical conductors, depending on the electrical configuration of the branch circuit wiring.

ASSEMBLY AND DISASSEMBLY

As shown in FIGS. 1 and 2, the electric insulating box assembly 11 is fully constructed and ready to receive branch circuit wiring 17 and electric fixture cables 19. The electric insulating box assembly 11 is constructed by connecting the various parts shown in FIGS. 6–15.

Connection terminal assemblies 21 and 51 are inserted into openings 22 in the area 40 defined by the second wall 39. Preferably, three first connection terminal assemblies 21 and one second connection terminal assembly 51 are inserted into the openings 22. The terminal assemblies 21 and 51 are inserted such that the first ends 47 and 53 of the terminal assemblies are on the upper side of the base 23 and the second ends 49 and 55 are on the lower side of the base.

The electric insulating box assembly 11 is positioned proximal an opening 16 near a ceiling 15 so that branch circuit wiring 17 may be connected to the first ends 47 and 53 of the connection terminal assemblies 21 and 51, as shown in FIGS. 16 and 17. Branch circuit wiring configurations having two electrical cables, a first cable 77 supplying power directly to the fixture and the second cable 79 (the switched leg) connected between the fixture and a switch as shown in FIG. 16, are connected to the terminal assemblies 21 and 51 as shown in FIG. 16. Branch circuit wiring configurations having a single electrical cable 75 (i.e., no switched leg cable) supplying power from a switch to the electrical fixture, are connected as shown in FIG. 17.

In some installations, there may be a need to connect or splice a second branch circuit cable or a second switched cable in the same terminal assemblies as 77 or 79. This may be accomplished by inserting the second cable in a similar manner as the first.

First ends of insulation displacement connection terminals are shown in FIGS. 3, and 12–14. Conductors are pushed through the V-shaped notches 81 in the first ends 47 and 53 of the connection terminal assemblies 21 and 51 and are held by receiving pockets 85. A conductor installation tool 89, as shown in FIG. 20, is then be used to simultaneously insert a plurality of conductors into their respective terminal contacts 87. The installation tool 89 is inserted through the opening 91 in the second wall 39 adjacent to the connection terminal assemblies 21 and 51. The tool is compressed, thereby pressing the conductors into the contacts 87 with the upper jaw 93 of the tool 89. Alternatively, the conductors may be pressed into the contacts 87 with the cover projections 78.

Once the branch circuit wiring 17 has been connected to the first end of the connection terminal assemblies 21 and 51, either one or both of the removable tabs 59 are removed from the cover 41. If a switched leg cable is present, then both tabs 59 are removed. If no switched leg cable is present, then only a single removable tab 59 is removed. The cover 41 is then snapped onto the second wall 39, thereby engaging the second wall projections 43 with the openings 45 in the cover.

The electrical insulating box assembly 11 is then inserted into the aperture 16 in the support surface until the flange 35 contacts the lower surface 73 of the support structure, as shown in FIG. 19. Fasteners 62 inserted through a first plurality of openings 31 in the base 23 and through an opening 69 in the mounting clips 61 are tightened, thereby securing the electrical insulating box assembly 11 to the support structure 15. As the fasteners 62 are tightened, the first legs 63 and the second legs 65 of the clips 61 are firmly clamped onto the upper surface 71 of the support structure 15 and the support shelf 48 in the second wall 39, respectively.

The electrical fixture 13 is positioned proximal the electrical insulating box assembly to connect the electrical fixture cables 19 to the second end of the connection terminals 21, as shown in FIG. 18. Once the electrical fixture cables 19 have been connected, fasteners (not shown) are inserted through openings (not shown) in the electrical fixture 13 and through a second plurality of openings 32 in the base 23 to secure the electrical fixture to the electrical insulating box assembly 11.

While advantageous embodiments have been chosen to illustrate the invention, it will be understood by those skilled in the art that various changes and modifications may be made therein without departing from the scope of the invention as defined in the appended claims.

What is claimed is:

1. An electrical insulating box assembly for mounting an electrical fixture, comprising:
    a base having an upper surface, a lower surface, an outer edge, and a first plurality of openings extending through said base;
    a first wall extending downwardly from said base outer edge and adapted to fit within an aperture in a surface;
    a flange extending radially outwardly from said first wall;
    a second wall extending upwardly from said upper surface of said base;
    a plurality of first terminals extending through said base and positioned within said second wall, each of said first terminals having a first end for receiving electrical conductors from branch circuit wiring and a second end for receiving electrical conductors from the electrical fixture, said first ends of said first terminals being insulation displacement connection terminals;
    a cover attached to said second wall forming an enclosure to house said plurality of first terminals;
    clips coupled to said insulating box assembly opposite said flange for mounting said insulating box assembly by gripping the surface between said clips and said flange; and
    a tool for connecting the electrical conductors with said insulation displacement connection terminals, said tool including
    a lower jaw having at least one first tine; and
    an upper jaw having at least one projection for inserting said conductors into said terminals.

2. The electrical insulating box assembly of claim 1, wherein
    said at least one projection is V-shaped.

3. The electrical insulating box assembly of claim 1, wherein
    said first ends of said first terminals have pockets for initially receiving the electrical conductors prior to fully inserting the conductors into said plurality of first terminals with said tool.

4. The electrical insulating box assembly of claim 1, wherein
    said second ends of said first terminals are selected from the group consisting of screw terminals, insulation displacement connection terminals, pressure contact terminals and plug and socket terminals.

5. The electrical insulating box assembly of claim 1, wherein
    first and second openings extend through said second wall for electrical cables coupled to said first ends of said first terminals within said enclosure.

6. The electrical insulating box assembly of claim 5, wherein
    said cover has first and second removable tabs extending over said first and second openings in said second wall.

7. The electrical insulating box assembly of claim 1, wherein
    said second wall and said cover have mating tabs and recesses for releasably securing said cover to said second wall sealing said enclosure.

8. The electrical insulating box assembly of claim 7, wherein
    a channel extends from said second wall proximal said tabs and recesses across said upper surface of said base to said first wall for receiving a tool to remove said cover from said second wall.

9. The electrical insulating box assembly of claim 1, wherein
    first fasteners, received in said first plurality of openings in said base, attach said mounting clips to said base.

10. The electrical insulating box assembly of claim 1, wherein
    said base has a second plurality of openings extending therethrough for receiving second fasteners for securing an electrical fixture to said electrical insulating box assembly.

11. The electrical insulating box assembly of claim 1, wherein
    said base has three first terminals and a second terminal.

12. The electrical insulating box assembly of claim 11, wherein
    said second terminal has a first end with an insulation displacement terminal.

13. The electrical insulating box assembly of claim 1, wherein
    said first ends of said first terminals are above said upper surface of said base.

14. The electrical insulating box assembly of claim 1, wherein
    said cover has projections.

15. An electrical insulating box assembly for mounting an electrical fixture, comprising:
    a base having an upper surface, a lower surface, an outer edge, and a first and a second plurality of openings extending through said base, each of said first plurality of openings receiving a first fastener, and each of said second plurality of openings receiving a second fastener for attaching the electrical fixture to said assembly;

a first wall extending downwardly from said base outer edge and adapted to fit within an aperture in a mounting surface;

a flange extending radially outwardly from said first wall;

a second wall extending upwardly from said upper surface of said base, first and second openings formed in said second wall for electrical conductors from branch circuit wiring, said second wall having first and second projections extending outwardly therefrom and circumferentially spaced about 180 degrees apart on said second wall;

a plurality of first terminals extending through said base and positioned within said second wall, each of said first terminals having a first end for receiving electrical conductors from the branch circuit wiring and a second end for receiving electrical conductors from the electrical fixture, each said first end having an insulation displacement connection terminal, each said second end having a screw terminal;

a second terminal extending through said base and positioned within said second wall, said second terminal having a first end for receiving the electrical conductor from the branch circuit wiring, said first end of said second terminal having an insulation displacement connection terminal;

a cover attached to said second wall forming an enclosure to house said first ends of said first terminals and said second terminal, said cover having first and second removable tabs covering said first and second openings in said second wall, and said cover having first and second recesses releasably coupled to said first and second projections to secure said cover to said second wall; and a clip attached to each of said first fasteners for mounting said insulating box assembly to the mounting surface with said flange.

16. The electrical insulating box assembly of claim 15, further comprising a tool for connecting the electrical conductors with said insulation displacement connection terminals, said tool including a lower jaw having at least one first tine; and an upper jaw having at least one projection for inserting said conductors into said terminals.

17. The electrical insulating box assembly of claim 16, wherein said at least one projection is V-shaped.

18. The electrical insulating box assembly of claim 15, wherein said first ends of said first terminals have pockets for initially receiving the electrical conductors prior to fully inserting the conductors into said plurality of terminals with said tool.

19. The electrical insulating box assembly of claim 15, wherein said second ends of said first terminals are selected from the group consisting of screw terminals, insulation displacement connection terminals, pressure contact terminals and plug and socket terminals.

20. The electrical insulating box assembly of claim 15, wherein a first channel extends from said second wall proximal said tabs and recesses across said upper surface of said base to said first wall for receiving a tool to remove said cover from said second wall.

21. The electrical insulating box assembly of claim 20, wherein a second channel on said lower surface of said base for guiding electrical conductors from the electrical fixture to the second ends of said plurality of first terminals.

22. The electrical insulating box assembly of claim 15, wherein said first ends of said first and second terminals are above said upper surface of said base.

23. The electrical insulating box assembly of claim 15, wherein said cover has projections.

24. An electrical insulating box assembly for mounting an electrical fixture, comprising:

an electrical fixture having electrical conductors and a plurality of openings for receiving fasteners;

a base having an upper surface, a lower surface, an outer edge, and a first and a second plurality of openings extending through said base, each of said first plurality of openings receiving a first fastener, and each of said second plurality of openings aligned with one of said plurality of electrical fixture openings for receiving a second fastener for attaching said electrical fixture to said assembly;

a first wall extending downwardly from said base outer edge and adapted to fit within an aperture in a mounting surface;

a flange extending radially outwardly from said first wall;

a second wall extending upwardly from said upper surface of said base, first and second openings formed in said second wall for passing electrical conductors from branch circuit wiring, said second wall having first and second projections extending outwardly therefrom said second wall and circumferentially spaced about 180 degrees apart on said second wall;

a plurality of first terminals extending through said base and positioned within said second wall, each of said first terminals having a first end for receiving the electrical conductors from the branch circuit wiring and a second end for receiving the electrical conductors from the electrical fixture, each said first end having an insulation displacement connection terminal, each said second end having a screw terminal;

a second terminal extending through said base and positioned within said second wall, said second terminal having a first end for receiving the electrical conductor from the branch circuit wiring, said first end of said second terminal having an insulation displacement connection terminal;

a cover attached to said second wall forming an enclosure to house said first ends of said first terminals and said second terminal, said cover having first and second removable tabs covering said first and second openings in said second wall, and said cover having first and second recesses releasably coupled to said first and second projections to secure said cover to said second wall; and a clip attached to each of said first fasteners for mounting said insulating box assembly to the mounting surface with said flange.

25. The electrical insulating box assembly of claim 24, further comprising a tool for connecting the electrical conductors with said insulation displacement connection terminals, said tool including
a lower jaw having at least one first tine; and
an upper jaw having at least one projection for inserting said conductors into said terminals.

26. The electrical insulating box assembly of claim 25, wherein
said at least one projection is V-shaped.

27. The electrical insulating box assembly of claim 25, wherein
said first ends of said first terminals have pockets for initially receiving the electrical conductors prior to fully inserting the conductors into said plurality of terminals with said tool.

28. The electrical insulating box assembly of claim 24, wherein
said second ends of said first terminals are selected from the group consisting of screw terminals, insulation displacement connection terminals, pressure contact terminals and plug and socket terminals.

29. The electrical insulating box assembly of claim 24, wherein
a first channel extends from said second wall proximal said projections across said upper surface of said base to said first wall for receiving a tool to remove said cover from said second wall.

30. The electrical insulating box assembly of claim 29, wherein
a second channel on said lower surface of said base for guiding electrical conductors from said electrical fixture to said second ends of said first terminals.

31. The electrical insulating box assembly of claim 24, wherein
said first ends of said first and second terminals are above said upper surface of said base.

32. The electrical insulating box assembly of claim 24, wherein
said cover has projections.

33. An electrical fixture mounting assembly, comprising:
an electrical fixture having electrical conductors and a plurality of openings for receiving fasteners;
a base having an upper surface, a lower surface, an outer edge, and a first and a second plurality of openings extending through said base, each of said first plurality of openings receiving a first fastener, and each of said second plurality of openings aligned with one of said plurality of electrical fixture openings for receiving a second fastener for attaching said electrical fixture to said assembly;
a first wall extending downwardly from said base outer edge and adapted to fit within an aperture in a mounting surface;
a flange extending radially outwardly from said first wall;
a second wall extending upwardly from said upper surface of said base, first and second openings formed in said second wall for passing electrical conductors from branch circuit wiring, said second wall having first and second projections extending outwardly therefrom said second wall and circumferentially spaced about 180 degrees apart on said second wall;
a plurality of first terminals extending through said base and positioned within said second wall, each of said first terminals having a first end for receiving the electrical conductors from the branch circuit wiring and a second end for receiving the electrical conductors from the electrical fixture, each said first end having an insulation displacement connection terminal, each said second end having a screw terminal;
a second terminal extending through said base and positioned within said second wall, said second terminal having a first end for receiving the electrical conductor from the branch circuit wiring, said first end of said second terminal having an insulation displacement connection terminal;
a cover attached to said second wall forming an enclosure to house said first ends of said first terminals and said second terminal, said cover having first and second removable tabs covering said first and second openings in said second wall, and said cover having first and second recesses releasably coupled to said first and second projections to secure said cover to said second wall;
a clip attached to each of said first fasteners for mounting said insulating box assembly to the mounting surface with said flange; and
a tool for connecting the electrical conductors with said insulation displacement connection terminals, said tool including
a lower jaw having at least one first tine; and
an upper jaw having at least one projection for inserting said conductors into said terminals.

34. The electrical insulating box assembly of claim 33, wherein
said at least one projection is V-shaped.

35. The electrical insulating box assembly of claim 33, wherein
said first ends of said first terminals have pockets for initially receiving the electrical conductors prior to fully inserting the conductors into said plurality of terminals with said tool.

36. The electrical insulating box assembly of claim 33, wherein
said second ends of said first terminals are selected from the group consisting of screw terminals, insulation displacement connection terminals, pressure contact terminals and plug and socket terminals.

37. The electrical insulating box assembly of claim 33, wherein
a first channel extends from said second wall proximal said projections across said upper surface of said base to said first wall for receiving a tool to remove said cover from said second wall.

38. The electrical insulating box assembly of claim 37, wherein
a second channel on said lower surface of said base for guiding electrical conductors from said electrical fixture to said second ends of said first terminals.

39. The electrical insulating box assembly of claim 33, wherein
said first ends of said first and second terminals are above said upper surface of said base.

40. An electrical insulating box assembly for mounting an electrical fixture, comprising:
a base having an upper surface, a lower surface, an outer edge, and a first plurality of openings extending through said base;
a first wall extending downwardly from said base outer edge and adapted to fit within an aperture in a surface;
a flange extending radially outwardly from said first wall;

a second wall extending upwardly from said upper surface of said base;

a plurality of first terminals extending through said base and positioned within said second wall, each of said first terminals having a first end for receiving electrical conductors from branch circuit wiring and a second end for receiving electrical conductors from the electrical fixture;

a cover attached to said second wall forming an enclosure to house said plurality of first terminals;

clips coupled to said insulating box assembly opposite said flange for mounting said insulating box assembly by gripping the surface between said clips and said flange;

first and second openings extending through said second wall for electrical cables coupled to said first ends of said first terminals within said enclosure; and first and second removable tabs on said cover extending over said first and second openings in said second wall.

41. The electrical insulating box assembly of claim 40, wherein said first ends of said first terminals are insulation displacement connection terminals.

42. The electrical insulating box assembly of claim 41, further comprising a tool for connecting the electrical conductors with said insulation displacement connection terminals, said tool including a lower jaw having at least one first tine; and an upper jaw having at least one projection for inserting said conductors into said terminals.

43. The electrical insulating box assembly of claim 42, wherein said at least one projection is V-shaped.

44. The electrical insulating box assembly of claim 42, wherein said first ends of said first terminals have pockets for initially receiving the electrical conductors prior to fully inserting the conductors into said plurality of first terminals with said tool.

45. The electrical insulating box assembly of claim 40, wherein said second ends of said first terminals are selected from the group consisting of screw terminals, insulation displacement connection terminals, pressure contact terminals and plug and socket terminals.

46. The electrical insulating box assembly of claim 40, wherein said second wall and said cover have mating tabs and recesses for releasably securing said cover to said second wall sealing said enclosure.

47. The electrical insulating box assembly of claim 46, wherein a channel extends from said second wall proximal said tabs and recesses across said upper surface of said base to said first wall for receiving a tool to remove said cover from said second wall.

48. The electrical insulating box assembly of claim 40, wherein first fasteners, received in said first plurality of openings in said base, attach said mounting clips to said base.

49. The electrical insulating box assembly of claim 40, wherein said base has a second plurality of openings extending therethrough for receiving second fasteners for securing an electrical fixture to said electrical insulating box assembly.

50. The electrical insulating box assembly of claim 40, wherein said base has three first terminals and a second terminal.

51. The electrical insulating box assembly of claim 50, wherein said second terminal has a first end with an insulation displacement terminal.

52. The electrical insulating box assembly of claim 40, wherein said first ends of said first terminals are above said upper surface of said base.

53. The electrical insulating box assembly of claim 40, wherein said cover has projections.

54. An electrical insulating box assembly for mounting an electrical fixture, comprising:

a base having an upper surface, a lower surface, an outer edge, and a first plurality of openings extending through said base;

a first wall extending downwardly from said base outer edge and adapted to fit within an aperture in a surface;

a flange extending radially outwardly from said first wall;

a second wall extending upwardly from said upper surface of said base;

a plurality of first terminals extending through said base and positioned within said second wall, each of said first terminals having a first end for receiving electrical conductors from branch circuit wiring and a second end for receiving electrical conductors from the electrical fixture;

a cover attached to said second wall forming an enclosure to house said plurality of first terminals;

clips coupled to said insulating box assembly opposite said flange for mounting said insulating box assembly by gripping the surface between said clips and said flange;

mating tabs and recesses on said second wall and said cover for releasably securing said cover to said second wall sealing said enclosure; and a channel extending from said second wall proximal said tabs and recesses across said upper surface of said base to said first wall for receiving a tool to remove said cover from said second wall.

55. The electrical insulating box assembly of claim 54, wherein said first ends of said first terminals are insulation displacement connection terminals.

56. The electrical insulating box assembly of claim 55, further comprising a tool for connecting the electrical conductors with said insulation displacement connection terminals, said tool including a lower jaw having at least one first tine; and an upper jaw having at least one projection for inserting said conductors into said terminals.

57. The electrical insulating box assembly of claim 56, wherein said at least one projection is V-shaped.

58. The electrical insulating box assembly of claim 56, wherein said first ends of said first terminals have pockets for initially receiving the electrical conductors prior to fully inserting the conductors into said plurality of first terminals with said tool.

59. The electrical insulating box assembly of claim 54, wherein
said second ends of said first terminals are selected from the group consisting of screw terminals, insulation displacement connection terminals, pressure contact terminals and plug and socket terminals.

60. The electrical insulating box assembly of claim 54, wherein
first and second openings extend through said second wall for electrical cables coupled to said first ends of said first terminals within said enclosure.

61. The electrical insulating box assembly of claim 60, wherein
said cover has first and second removable tabs extending over said first and second openings in said second wall.

62. The electrical insulating box assembly of claim 54, wherein
first fasteners, received in said first plurality of openings in said base, attach said mounting clips to said base.

63. The electrical insulating box assembly of claim 54, wherein
said base has a second plurality of openings extending therethrough for receiving second fasteners for securing an electrical fixture to said electrical insulating box assembly.

64. The electrical insulating box assembly of claim 54, wherein
said base has three first terminals and a second terminal.

65. The electrical insulating box assembly of claim 64, wherein
said second terminal has a first end with an insulation displacement terminal.

66. The electrical insulating box assembly of claim 54, wherein
said first ends of said first terminals are above said upper surface of said base.

67. The electrical insulating box assembly of claim 54, wherein
said cover has projections.

68. An electrical insulating box assembly for mounting an electrical fixture, comprising:
a base having an upper surface, a lower surface, an outer edge, and a first plurality of openings extending through said base;
a first wall extending downwardly from said base outer edge and adapted to fit within an aperture in a surface;
a flange extending radially outwardly from said first wall;
a second wall extending upwardly from said upper surface of said base;
a plurality of first terminals extending through said base and positioned within said second wall, each of said first terminals having a first end for receiving electrical conductors from branch circuit wiring and a second end for receiving electrical conductors from the electrical fixture;
a cover attached to said second wall forming an enclosure to house said plurality of first terminals;
clips coupled to said insulating box assembly opposite said flange for mounting said insulating box assembly by gripping the surface between said clips and said flange; and
first fasteners received in said first plurality of openings in said base to attach said mounting clips to said base.

69. The electrical insulating box assembly of claim 68, wherein
said first ends of said first terminals are insulation displacement connection terminals.

70. The electrical insulating box assembly of claim 69, further comprising
a tool for connecting the electrical conductors with said insulation displacement connection terminals, said tool including
a lower jaw having at least one first tine; and
an upper jaw having at least one projection for inserting said conductors into said terminals.

71. The electrical insulating box assembly of claim 70, wherein
said at least one projection is V-shaped.

72. The electrical insulating box assembly of claim 70, wherein
said first ends of said first terminals have pockets for initially receiving the electrical conductors prior to fully inserting the conductors into said plurality of first terminals with said tool.

73. The electrical insulating box assembly of claim 68, wherein
said second ends of said first terminals are selected from the group consisting of screw terminals, insulation displacement connection terminals, pressure contact terminals and plug and socket terminals.

74. The electrical insulating box assembly of claim 68, wherein
first and second openings extend through said second wall for electrical cables coupled to said first ends of said first terminals within said enclosure.

75. The electrical insulating box assembly of claim 74, wherein
said cover has first and second removable tabs extending over said first and second openings in said second wall.

76. The electrical insulating box assembly of claim 68, wherein
said second wall and said cover have mating tabs and recesses for releasably securing said cover to said second wall sealing said enclosure.

77. The electrical insulating box assembly of claim 76, wherein
a channel extends from said second wall proximal said tabs and recesses across said upper surface of said base to said first wall for receiving a tool to remove said cover from said second wall.

78. The electrical insulating box assembly of claim 68, wherein
said base has a second plurality of openings extending therethrough for receiving second fasteners for securing an electrical fixture to said electrical insulating box assembly.

79. The electrical insulating box assembly of 68, wherein said base has three first terminals and a second terminal.

80. The electrical insulating box assembly of 79, wherein said second terminal has a first end with an insulation displacement terminal.

81. The electrical insulating box assembly of claim 68, wherein
said first ends of said first terminals are above said upper surface of said base.

82. The electrical insulating box assembly of claim 68, wherein
said cover has projections.

* * * * *

UNITED STATES PATENT AND TRADEMARK OFFICE
CERTIFICATE OF CORRECTION

PATENT NO. : 6,586,672 B2
DATED : July 1, 2003
INVENTOR(S) : John R. Kobus et al.

It is certified that error appears in the above-identified patent and that said Letters Patent is hereby corrected as shown below:

<u>Title page,</u>
Item [75], Inventor, the fourth named inventor has been changed to
-- Christopher S. Kuhn --.

Signed and Sealed this

Second Day of December, 2003

JAMES E. ROGAN
*Director of the United States Patent and Trademark Office*